UNITED STATES PATENT OFFICE.

EDWARD WATSON, OF GRAND RAPIDS, MICHIGAN.

MANUFACTURE OF MATERIAL FOR CALCIMINING.

SPECIFICATION forming part of Letters Patent No. 522,634, dated July 10, 1894.

Application filed March 15, 1893. Serial No. 466,109. (No specimens.)

*To all whom it may concern:*

Be it known that I, EDWARD WATSON, a citizen of the United States, residing at Grand Rapids, in the county of Kent and State of Michigan, have invented certain new and useful Improvements in Manufacturing Material for Calcimine or Temporary Painting, of which the following is a specification.

Material for calcimine or decorative painting is prepared in a dry form, containing all the necessary ingredients, and ready for use by the addition of water only. The principal pigment constituting the body of such compositions is calcined gypsum, to which various coloring matters may be added. It is also the practice of the artist as well as the manufacturer to add to the compound various acids or salts, believing such additions improve the body and spreading property of the calcimine. All of which may enter into the compound made by my process.

Whatever adhesive matter may be used or whatever other matter may be introduced, my invention is directed to an improved process of incorporating the adhesive matter with the dry pigments and other material entering into the compound.

In making material by my process, if desirable to add any coloring material or other matter, such additions may be made at any stage of the process, or be introduced into the finished product.

The essential point in my invention is that in incorporating adhesive matter with calcined gypsum in making compounds for wall coating, I first reduce the adhesive matter to a liquid by water, then mix the liquid adhesive matter with calcined gypsum, and then at once force the greater part of the water to chemically unite with the calcined gypsum, notwithstanding the restraining effect of the organic adhesive matter on the chemical union of water with calcined gypsum, and thus at once transform a pasty unmanageable mass into a partially dry mixture, easily stirred and handled in subsequent operations.

In practice I may first incorporate the adhesive matter with all the calcined gypsum or other ingredients designed to enter into the finished product, or I may first incorporate the adhesive matter with part of the calcined gypsum, and then add the product to the remainder of the material, or I may first incorporate the adhesive matter with calcined gypsum and add to the product raw gypsum.

In practically carrying out my invention, my process is about as follows: I first reduce the adhesive matter to a liquid by the addition of as little water as will make a solution, about one pint of water to each pound of dry adhesive matter will generally serve the purpose. I then mix the adhesive liquid with calcined gypsum, and then force the water to at once chemically unite with the calcined gypsum, which I do by adding acid to the mixture. I have found it the best practice to somewhat dilute sulphuric acid with water, and then gradually mix it with the calcined gypsum and liquid adhesive matter until a distinct rise of temperature is perceptible, and the mass becomes less tenacious, and a partially dry powder, which is proof that the water is uniting by crystallization with the gypsum, then add no more acid. Inasmuch as some gypsum may require more acid than other samples, by experiment the necessary quantity of acid may be accurately determined, and in such case may be first mixed with the liquid adhesive matter, and then mixed with the calcined gypsum. The next step is to dry the mixture. In drying this compound, the process may be hastened by heat, which should not be so great as to injure the organic adhesive matter. The heat should not usually be carried much above 212° Fahrenheit, but if it is desirable to expel the water of crystallization from the gypsum, then the heat may be cautiously raised as high as 250° Fahrenheit, and be maintained at that temperature some time after the free water has been expelled. After drying the compound the product is to be subsequently reduced to a very fine powder, when it will be ready to use at any subsequent time by simply mixing with water.

It may be stated that in adhesive compounds for wall coating, the quantity of adhesive matter varies from fifty to two hundred pounds to each two thousand pounds of dry pigment, depending upon the degree of defense desired to offer against rubbing or scaling off.

I claim—

The process of manufacturing an adhesive wall coating compound, which consists of the following steps: first, mixing liquid adhesive matter with calcined gypsum, then gradually adding sulphuric acid to the mixture until a distinct rise of temperature is perceptible, and the mass becomes less tenacious and a partially dry powder, then expelling the water by heat, and subsequently reducing the product to a very fine powder, substantially as described.

EDWARD WATSON.

Witnesses:
JOHN A. VERKERKE,
FRED R. SHEAR.